Patented Aug. 19, 1952

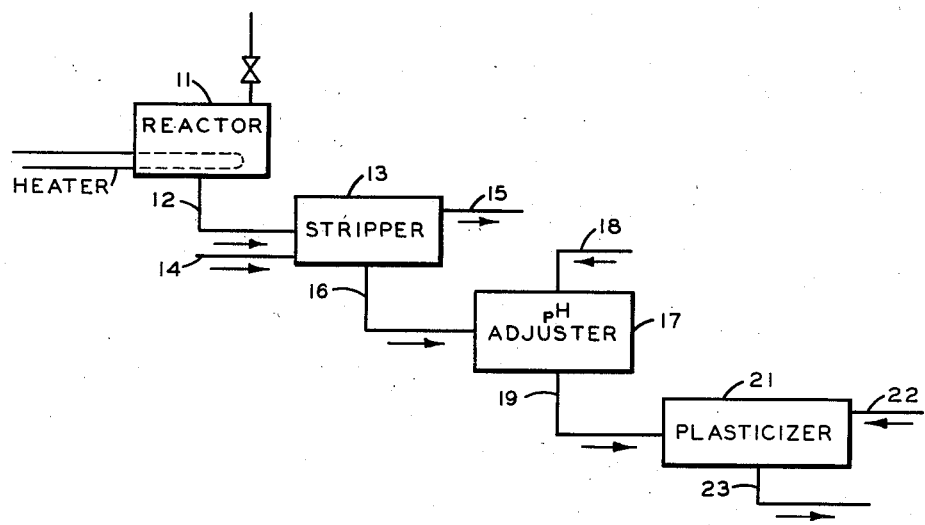
INVENTOR.
W.W. CROUCH
J.F. HOWE
BY
Hudson and Young
ATTORNEYS

2,607,752

UNITED STATES PATENT OFFICE 2,607,752

RESIN OF SULFUR DIOXIDE AND AN UNSATURATED ORGANIC COMPOUND WHICH REACTS TO FORM A HETEROPOLYMERIC RESIN

Willie W. Crouch and John F. Howe, Bartlesville, Okla., assignors to Phillips Petroleum Company, a corporation of Delaware Application January 2, 1951, Serial No. 204,068

19 Claims. (Cl. 260—32.4)

This invention relates to the production of synthetic resinous materials formed by reaction between sulfur dioxide and one or more unsaturated compounds. In one of its more specific aspects it relates to the production of olefin-sulfur dioxide resin compositions. In another of its more specific aspects it relates to the production of homogeneous olefin-sulfur dioxide resin compositions.

This application is a continuation-in-part of U. S. application Serial Number 129,867, filed November 28, 1949.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, ortho-allylanisole, ortho-allylphenol, para-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

Olefin-sulfur dioxide polysulfones are inherently relatively inexpensive, usually thermoplastic resins, compatible with many other polymeric materials, and are potentially useful in numerous applications for which much more expensive resins are presently employed. Commercial development of olefin-sulfur dioxide resins has heretofore been considerably delayed, largely because of their brittleness and tendencies to crack and to shatter on breaking. Broadly speaking, this invention comprises forming olefin-sulfur dioxide resin compositions by plasticizing and stabilizing olefin-sulfur dioxide resins and resin latices having pH values not greater than 8, with a nitrile. The compositions of our invention are superior for many applications to unplasticized and unstabilized olefin-sulfur dioxide resins.

Utility of these resins has in the past been limited in part because of their lack of thermal stability, i. e., resistance to decomposition by heat, at temperatures such as from 200° F. to 500° F. Accordingly, these resins often cannot be employed satisfactorily in the production of molded articles. On being exposed to temperatures as high as 200° F. or higher over a short period, for example 1 to 3 hours, decomposition of the heteropolymer takes place to liberate sulfur dioxide and initial unsaturate reactant. The resin thus becomes porous and somewhat voluminous and is undesirable for the use for which it was intended. We have found that olefin-sulfur dioxide resins are very appreciably stabilized by adding a nitrile thereto as more fully disclosed hereinafter. They are less brittle and more resistant to cracking and to shattering on breaking. In many cases they are flexible and completely resistant to shattering.

An object of this invention is to mix olefin-sulfur dioxide resins with nitriles to form improved olefin-sulfur dioxide resin compositions. Another object of the invention is to produce homogeneous mixtures of olefin-sulfur dioxide resins and nitriles to form flexible resin compositions. Another object of this invention is to provide an improved method for producing homogeneous, stable latices of plasticized olefin-sulfur dioxide resins. Another object of the invention is to provide a means and method for stabilizing olefin-sulfur dioxide resins. Other and further objects and advantages of this invention will be apparent to those skilled in the art upon study of the accompanying disclosure and discussion.

The production of materials of the polymeric type in aqueous emulsion is well known. Emulsion polymerization methods are particularly important and are widely used in the manufacture of synthetic rubber, and the like. Usually, however, the monomers employed in these processes are compounds such as butadiene, isoprene, chloroprene, methyl acrylate, methyl methacrylate, acrylonitrile, styrene, and the like. These monomers are chemically neutral, that is, they have neither strongly acidic nor basic properties. Furthermore, most of them have little or no solubility in water so that when they are used in emulsion polymerization processes they form a water-insoluble phase which contains substantially all of the monomers. These compounds are also non-electrolytes, that is, any part of the material that enters the water phase is not ionized and therefore does not interfere with the action of the emulsifying agent.

In contrast to the above mentioned monomers, sulfur dioxide is highly soluble in water and reacts with water to form an electrolyte, sulfurous acid, which has pronounced acidic properties. In the emulsion copolymerization of sulfur dioxide with unsaturated compounds, the sulfur dioxide is divided between the aqueous and nonaqueous phases but a substantial portion of it remains in the aqueous phase which, as hereinbefore mentioned, is quite acidic. The usual emulsifying agents employed for carrying out polymerization reactions are not applicable in the presence of sulfur dioxide. In fact, the addition of an acidic electrolyte such as sulfurous acid to a resin or rubber latex prepared in the usual way is known to be an effective means of coagulating the latex and agglomerating the polymer.

The olefin-sulfur dioxide resins prepared in any manner are stabilized during or after the plasticizing operation. The important factor is that the selected nitriles must be thoroughly and intimately mixed with the resin or latex. Thus for example, the nitrile stabilization agent may be added to an aqueous dispersion of the resin in which the latter was prepared and both the resin and stabilizer precipitated therefrom simultaneously. The dry resin and the stabilizer can also be intimately mixed on a roll mill. The stabilizer may be dissolved in methanol or other suitable solvent and thoroughly admixed with a dry, powdered resin and the solvent subsequently removed by evaporation or other suitable means.

The compositions of our invention may be produced in any suitable manner. Olefin-sulfur dioxide resins prepared in any manner may be plasticized by mixing the components on a roll mill, by dissolving the components in a solvent and then evaporating the solvent or, when the resin is prepared by forming an aqueous emulsion of the sulfur dioxide and olefin, the resulting latex can be mixed with an aqueous dispersion of the organic plasticizer.

The last named method is often preferred. By this method a latex of a plasticized resin is produced. The latex may be used as such or it may be coagulated and the resin recovered and dried to obtain a plasticized resin in bulk form. The olefin-sulfur dioxide resin latex used in this method may be conveniently produced by emulsifying a monoolefinic organic material in an aqueous solution of sulfur dioxide and reacting the monoolefinic organic material and sulfur dioxide at a temperature in the range between 10° F. and 140° F. to produce a latex of a heteropolymeric reaction product. To this latex is added a dispersion or emulsion of a nitrile to produce a plasticized olefin-sulfur dioxide resin in stable latex form.

The compositions of our invention comprise between 1 and 150 parts by weight of plasticizer per 100 parts by weight of resin, preferably between 5 and 80 parts by weight of plasticizer per 100 parts by weight of resin, the plasticizer being a nitrile having a boiling point of 250° F. or above, a molecular weight of between 80 and 1000, and the absence of any aliphatic hydrocarbon group containing more than six carbon atoms. Materials which are suitable plasticizers for this invention fall within three general classes, i. e., aliphatic nitriles, aromatic substituted aliphatic nitriles, aromatic substituted aliphatic nitriles in which the aromatic ring is substituted by aliphatic groups and cyclo aliphatic nitriles. Specific materials which are suitable plasticizers for this invention include adiponitrile, benzonitrile, phenylacetonitrile, succinonitrile, valeronitrile, pentenenitrile, m-butylbenzonitrile, phenylpropionitrile, and mesitylenonitrile. Nitrile compounds which do not have the properties and characteristics listed above and which do not form homogeneous mixtures with olefin-sulfur dioxide resins are exemplified by m-octylbenzonitrile, decanenitrile, which contain aliphatic groups of more than six carbon atoms, and acetonitrile, and propionitrile, which have boiling points and molecular weights below those required by this invention.

All of the above named nitriles as well as others are suitable as stabilizing agents of this invention. Stabilizing agents of this invention have the following general formula RCN wherein R is an alkyl, cycloalkyl, alkenyl, hydrocarbon aromatic group, or substituted alkyl, cycloalkyl, or alkenyl group wherein the substituents are selected from a group consisting of a cyano radical and a halogen radical selected from the group consisting of fluorine, chlorine, and bromine, or a substituted hydocarbon aromatic wherein the substituents are selected from a group consisting of alkyl and halogen radicals selected from the group consisting of fluorine, chlorine, and bromine. Examples of materials which come within the definition of the above general formula, in addition to the nitriles named above, are isocapronitrile, chloroacetonitrile, fluoroacetonitrile, bromoacetonitrile, hexadecanenitrile, and diphenylacetonitrile.

Nitriles having physical properties falling within a range and also extending outside that defining limit for the plasticizers are suitable as stabilizers. The stabilization agent of this invention is a nitrile, described above, which has a boiling point of at least 170° F., preferably 245° F., a molecular weight of between 40 and 1000, and the absence of any aliphatic hydrocarbon group containing more than twenty carbon atoms. The ratio of stabilizer to resin which is satisfactorily used is 0.5:100 to 150:100. Ordinarily a ratio of 15:100 will be sufficient for stabilization purposes.

The drawing is a schematic flow plan utilized in the preferred method of this invention.

Referring particularly to the drawing, an olefin-sulfur dioxide resin latex in passed from reactor 11 through conduit 12 to stripper chamber 13 where most of the excess sulfur dioxide and unreacted olefin are removed by passing steam, hot air, or the like into stripper chamber 13 through inlet conduit 14 and removing the stripping materials, together with the removed impurities, from stripper chamber 13 through outlet conduit 15. Impurities may be removed from olefin-sulfur dioxide resins prepared in aqueous emulsion by coagulation of the latex and subsequent water washing, filtration, and drying of the coagulum. In order to utilize a continuous process for the preparation of our olefin-sulfur dioxide resin compositions, we prefer to use the latex. By operating in such a manner we get a better dispersion and obtain a plasticized resin in latex form. However, it has not been found possible to reduce the sulfur dioxide content to much less than 0.5 weight per cent of the latex, or to obtain a pH much less acidic than about 1.5 by such physical means. The purified latex is removed from stripper chamber 13 through conduit 16 and is passed into chamber 17 where its pH value is adjusted by the addition of a base through conduit 18 to a value of not above 8. The latex material, the pH value of which has been adjusted, is removed from chamber 17 through conduit 19 and is passed to plasticizer chamber 21. An organic plasticizing compound such as has been described above is added in the form of an emulsion or dispersion to the latex material in chamber 21 through conduit 22. The latex and the plasticizer material are mixed within chamber 21 in such proportions that the weight ratio of plasticizer to resin is, as disclosed above, preferably within the range of from 5:100 to 80:100. The final solids content (plasticizer plus resin) concentration of the plasticized olefin-sulfur dioxide resin latex is generally within the range of from 15 to 70 weight per cent, although values from 30 to 65 weight per cent are preferred. The plasticized latex material is removed from the plasticizer chamber 21 through outlet conduit 23.

The plasticizing step of this preferred method of operating our process generally requires the previous emulsification of the plasticizer. This may be done in any suitable manner, e. g., the plasticizer may be added to an aqueous emulsifier solution and emulsified, or a fatty acid may be dissolved in the plasticizer and the plasticizer containing the dissolved fatty acid may be added to an aqueous alkaline solution and emulsified. In this case the emulsifying agent is formed in situ. The physical process of emulsification may be effected in any effective manner, such as by passing the mixture through a gear pump, a centrifugal pump, or a colloid mill, by turbulent flow or by agitating the materials with a paddle or stirrer, or by shaking in a suitable container. The term "plasticizer" as employed herein is used to define a nitrile material compatible with an olefin-sulfur dioxide polymer which lowers the softening temperature of the polymer and/or makes it more flexible.

The concentration of the plasticizer in the plasticizer emulsion or dispersion may be in the range of from 20 to 70 weight per cent. The concentration of the emulsifying agent in the plasticizer emulsion may lie in the range of from 0.2 to 5 weight per cent. Any suitable emulsifying agent or mixture of emulsifying agents may be used which is effective to produce a physically stable emulsion or dispersion. Examples of suitable emulsifying agents are the long chain alkyl sulfates and sulfonates, the aryl and alkaryl sulfonates, the fatty acid soaps, rosin acid soaps, non-ionic emulsifying agents, such as condensation products of an alkyl phenol and ethylene oxide, cationic emulsifying agents, such as salts of organic bases exemplified by amine salts, and quaternary ammonium salts, for example, heptadecyl-amine-epichlorhydrin, dodecylamine hydrochloride, and the like.

The above described four-step method of operation consisting of polymerization, stripping, adjustment of the pH value of the latex, and mixing of the latex with a plasticizer emulsion is the preferred procedure for making latex of low acidity and dissolved sulfur dioxide content. Such a latex is preferred for most applications, such as for impregnating cloth and paper, and for many types of surface coatings, as well as for unsupported films. It should be understood, however, that this preferred procedure may be modified somewhat and still yield a stable plasticized resin latex satisfactory for certain other applications or for use as a source of solid plasticized resin through coagulation of the latex. In one modification of the invention, the addition of a base to the latex to adjust the pH value thereof may follow rather than precede the addition of the plasticizer emulsion to the latex. In some cases, however, in such a modification more emulsifier is required than in the preferred procedure so as to avoid partial coagulation of the latex on addition of the plasticizer emulsion. In a second modification of the invention, if sufficient emulsifier is present the latex may be plasticized without adjusting the pH, without stripping the latex to remove excess sulfur dioxide, or without doing either to give a highly acidic latex of a plasticized resin. Such a modification, however, requires a considerably greater amount of emulsifier than is present at the time of addition of the plasticizer in the preferred procedure. The best olefin-sulfur dioxide resin compositions are obtained when the latex is stripped and when the pH value thereof is adjusted so as to fall within the range of from 3 to 8 before plasticization.

The latices of olefin-sulfur dioxide resins produced as above described may be employed in latex form or the latex may be coagulated and the plasticized resin recovered.

Advantages of this invention are illustrated by the following examples. The reactants and their proportions and other specific ingredients of the recipes are presented as being typical and should not be construed to limit the invention unduly.

EXAMPLE I

Three 1-butene-sulfur dioxide resin compositions containing nitriles were prepared in the following manner. A 10 weight per cent solution of the resin and 30 weight per cent acetone solutions of the nitriles were prepared. Portions of the resin solutions were thoroughly mixed with individual nitrile solutions in proportions such that the resin and the nitrile were in proportions within the range set forth above. Each solution so prepared was then poured on a watch glass and the acetone slowly evaporated from it. The solid film so produced was in all cases clear and transparent, which indicated a homogeneous film. Results of the routine tests are set forth in Table I.

TABLE I

*1-Butene-sulfur dioxide resin compositions with certain nitriles*

| Nitrile, Name | Weight Percent | Appearance of Film |
|---|---|---|
| Adiponitrile | 30 | clear. |
| Benzonitrile | 30 | Do. |
| Phenyl acetonitrile | 30 | Do. |

EXAMPLE II

A 1-butene-sulfur dioxide resin latex was prepared by emulsion polymerization according to the following recipe:

| | Parts by weight |
|---|---|
| 1-butene | 46.7 |
| Sulfur dioxide | 88.3 |
| Lithium nitrate | 0.5 |
| Sodium alkyl sulfate emulsifier | 2.0 |
| Water | 120.0 |

The reaction mixture was agitated for four hours at a temperature of 77° F. The latex was stripped in a column to remove most of the unreacted sulfur dioxide. It was then stabilized with 8 parts of a five per cent aqueous alkyl sulfate emulsifier solution per 100 parts of latex, and the pH was adjusted to a value of 4.3 with a seven per cent aqueous ammonia solution. The latex then had a solids content of 37.5 weight per cent.

An emulsion of a plasticizer was prepared using the following recipe:

| | Parts by weight |
|---|---|
| Plasticizer | 100 |
| Oleic acid | 1.9 |
| Ammonia | 0.15 |
| Water | 51.8 |

The plasticizer employed was phenyl acetonitrile. The oleic acid was dissolved in the plasticizer. The ammonia was dissolved in water, and this aqueous solution was added to the plasticizer containing the dissolved acid. This mixture was passed through a homogenizer till an emulsion was formed. The plasticizer emulsion was mixed with a sample of the latex previously prepared in such proportions that the resulting plasticized resin latex contained 30 parts of plasticizer for every 100 parts of resin. The plasticized resin latex so formed was stable. A film of the plasticized resin was formed by spreading a sample of the plasticized resin on a flat surface and slowly evaporating the water. The film so formed was clear and continuous.

One of the most unexpected features of the process of this invention is the fact that coagulation is avoided if the pH value of the latex is maintained at a value not above 8 regardless of the pH value of the plasticizer emulsion. The usual procedure heretofore has been to adjust the latex pH value to conform with the plasticizer emulsion pH value when mixing emulsified plasticizer with other polymer latices.

EXAMPLE III

An olefin-sulfur dioxide resin was prepared by aqueous emulsion polymerization, employing the following recipe:

| | Parts by weight |
|---|---|
| Olefin blend [1] | 57.7 |
| Sulfur dioxide | 88.3 |
| Water | 180 |
| Ammonium nitrate | 0.5 |
| Maprofix MM [2] | 0.6 |

[1] The olefin blend had the following composition:

| | Mol per cent |
|---|---|
| n-Butane | 13.4 |
| Iso-butane | 4.6 |
| C₃ (propane-propylene) | 1.0 |
| Iso-butylene | 3.6 |
| 1-butene | 63.2 |
| 2-butene-cis | 1.0 |
| 2-butene-trans | 12.5 |
| Butadiene | 0.7 |

[2] Sodium lauryl sulfate dispersing agent (in the form of a paste containing about 60 per cent solids).

The polymerization was conducted for a period of 7 hours and a 95 per cent conversion was obtained, based on the total olefins added. The resin was prepared from the latex and dried according to conventional procedure. The stabilizers indicated in the table below were added in indicated per cent by weight of dry resin and the per cent decomposition was determined as follows:

Two grams of the stabilizer-treated resin were placed in a suitable test tube which was then partially immersed in a constant temperature bath held at 325±2° F. for varying periods. Per cent loss in weight of the resin was determined at the end of indicated heating periods. The per cent loss in weight provides a measure of the thermal decomposition which took place. Untreated controls were run simultaneously with the tests.

Results of the tests are recorded in Table II below.

*Addition procedures*

1. Dissolve stabilizer in methanol and apply to dry resin followed by evaporation of methanol.
2. Dissolve 2 grams stabilizer in benzene and emulsify mixture in 30 grams of 1% Orvus [1] solution (aqueous). Emulsion so formed added to acid latex.

Table II

| | Method Added | Per cent loss in Weight at End of x Hours Heating at 325±2° F | | | |
|---|---|---|---|---|---|
| | | 0.5 | 1 | 2 | 4 |
| | Control | 7.3 | 10.9 | 15.1 | 29.0 |
| 1 | Diphenylacetonitrile, 2% | 1.2 | 2.3 | 3.3 | 4.3 |
| 1 | Diphenylacetonitrile, 1% | 2.5 | 3.7 | 4.3 | 5.7 |
| 2 | Diphenylacetonitrile, 2% | 3.2 | 4.3 | 5.1 | 6.3 |

| | | HOURS | | | |
|---|---|---|---|---|---|
| | | 0.5 | 1 | 3 | |
| | Control | 6.0 | 9.2 | 16.8 | |
| 1 | Diphenylacetonitrile, .5% | 6.3 | 8.7 | 14.5 | |
| | Control | 8.1 | 10.8 | 16.6 | |
| 1 | Isocapronitrile (C₇H₁₅CN), 2% | 5.7 | 7.7 | 11.7 | |
| 1 | Benzonitrile, 2% | 3.9 | 5.3 | 8.2 | |
| 1 | Succinonitrile, 2% | 2.1 | 3.4 | 6.2 | |
| 1 | Adiponitrile, 2% | 4.5 | 7.5 | 12.2 | |
| | Control | 6.0 | 9.2 | 16.8 | |
| 1 | Chloroacetonitrile, 2% | 2.7 | 3.9 | 7.2 | |
| 1 | Hexadecanenitrile, 2% | 5.0 | 7.3 | 13.3 | |
| | Control | 5.6 | 8.9 | 15.1 | |
| 1 | Benzonitrile, 0.5% | 3.8 | 5.6 | 9.2 | |
| 1 | Benzonitrile, 1% | 4.6 | 6.3 | 9.0 | |
| 1 | Chloroacetonitrile, 0.5% | 4.7 | 7.6 | 12.4 | |
| 1 | Chloroacetonitrile, 1% | 3.9 | 6.4 | 10.8 | |
| 1 | Succinonitrile, 0.5% | 4.8 | 6.6 | 10.1 | |
| 1 | Succinonitrile, 1% | 4.5 | 6.2 | 9.4 | |

EXAMPLE IV

A 1-pentene resin was prepared according to the following recipe:

| | Parts by weight |
|---|---|
| 1-pentene | 46.7 |
| Sulfur dioxide | 88.3 |
| Maprofix MM | 0.6 |
| Ammonium nitrate | 0.5 |
| Water | 180 |

Conditions: Stainless steel autoclave reactor
Temperature: 100° F.
Time: 11 hours
Conversion: 98%

The resin was prepared from the latex and dried according to the conventional procedure. Two weight per cent of diphenylacetonitrile was added to this resin by method 1 of Example III. An untreated control was run simultaneously with

[1] Sodium lauryl sulfate.

this test. Results are set forth below in Table III.

*Table III*

|  | Per cent loss in Weight at End of x Hours Heating at 325 ±2° F | | |
|---|---|---|---|
|  | 0.5 | 1 | 3 |
| Control | 5.3 | 7.2 | 10.4 |
| Diphenylacetonitrile, 2% | 3.4 | 4.3 | 5.7 |

As will be evident to those skilled in the art, various modifications of this invention can be made or followed in the light of the foregoing disclosure and discussion without departing from the spirit or the scope of the disclosure.

We claim:

1. A resin composition of sulfur dioxide and an unsaturated compound which reacts with sulfur dioxide to form a heteropolymeric resin, consisting essentialy of a nitrile boiling above 250° F., having a molecular weight of between 80 and and 1000, and having no aliphatic hydrocarbon group containing more than six carbon atoms and an unsaturated organic compound-sulfur dioxide resin being present in a ratio of parts by weight of nitrile to resin within the range of 1:100 to 150:100.

2. The composition of claim 1, wherein said nitrile and said unsaturated organic compound-sulfur dioxide resin are present in a ratio of parts by weight within the range of 5:100 to 80:100.

3. An olefin-sulfur dioxide resin composition consisting essentially of a nitrile boiling above 250° F., having a molecular weight of between 80 and 1000, having no aliphatic hydrocarbon group containing more than six carbon atoms and an olefin-sulfur dioxide resin latex having a pH value not above 8, said nitrile and said olefin-sulfur dioxide resin being present in a ratio of parts by weight within the range of 1:100 to 150:100.

4. The composition of claim 3, wherein said nitrile and said olefin-sulfur dioxide resin are present in a ratio of parts by weight within the range of 5:100 to 80:100.

5. The composition of claim 3, wherein said nitrile is an aliphatic nitrile.

6. The composition of claim 3, wherein said nitrile is adiponitrile.

7. The composition of claim 3, wherein said nitrile is an aromatic substituted aliphatic nitrile.

8. The composition of claim 3, wherein said nitrile is benzonitrile.

9. The composition of claim 3, wherein said nitrile is phenylacetonitrile.

10. The composition of claim 3, wherein said nitrile is an aromatic substituted aliphatic nitrile in which the aromatic ring is substituted by aliphatic groups.

11. A method of producing olefin-sulfur dioxide resin compositions which comprises emulsifying an olefinic organic material in an aqueous solution of sulfur dioxide, said sulfur dioxide being in an amount stoichiometrically in excess of said olefin; effecting a reaction between said sulfur dioxide and said olefinic organic compound to produce a heteropolymeric reaction product; and mixing a resin latex resulting from said reaction with a nitrile in a ratio within the nitrile to resin latex range of between 1:100 and 150:100, said nitrile boiling above 250° F., having a molecular weight of between 80 and 1000, and having no aliphatic hydrocarbon group containing more than six carbon atoms, to form a stable latex.

12. The method of claim 11, wherein said stable latex is coagulated and recovered.

13. The method of claim 11, wherein the ratio of nitrile to resin latex is in the range of 5:100 to 80:100.

14. A resin composition of sulfur dioxide and an unsaturated compound which reacts with sulfur dioxide to form a heteropolymeric resin, consisting essentially of a nitrile boiling above 170° F., having a molecular weight of between 40 and 1000, and having no aliphatic hydrocarbon group containing more than twenty carbon atoms and an unsaturated organic compound-sulfur dioxide resin being present in a ratio of parts by weight of nitrile to resin within the range of 0.5:100 to 150:100.

15. The composition of claim 14, wherein said nitrile and said olefin-sulfur dioxide resin are present in a ratio of parts by weight within the range of 0.5:100 to 15:100.

16. The composition of claim 15, wherein said nitrile is an aromatic substituted aliphatic nitrile.

17. The composition of claim 16, wherein said nitrile is diphenylacetonitrile.

18. The composition of claim 19, wherein said nitrile boils above 245° F.

19. A resin composition of sulfur dioxide and an unsaturated compound which reacts with sulfur dioxide to form a heteropolymeric resin, consisting essentially of a nitrile having the general formula RCN wherein R is selected from the group consisting of alkyl; cycloalkyl; alkenyl; hydrocarbon aromatic; substituted alkyl, cycloalkyl, and alkenyl groups wherein the substituents are selected from the group consisting of cyano and halogen radicals selected from the group consisting of fluorine, chlorine, and bromine; and substituted hydrocarbon aromatics wherein the substituents are selected from the group consisting of alkyl and halogen radicals selected from the group consisting of fluorine, chlorine, and bromine; said nitrile boiling above 170° F., having a molecular weight of between 40 and 1000, and having no aliphatic hydrocarbon group containing more than 20 carbon atoms and an unsaturated organic compound-sulfur dioxide resin being present in a ratio of parts by weight of nitrile to resin within the range of 0.5:100 to 150:100.

WILLIE W. CROUCH.
JOHN F. HOWE.

REFERENCES CITED

The following references are of record in the file of this patent:

UNITED STATES PATENTS

| Number | Name | Date |
|---|---|---|
| 2,339,362 | Snow | Jan. 18, 1944 |